(12) United States Patent
Shang et al.

(10) Patent No.: US 12,469,576 B2
(45) Date of Patent: Nov. 11, 2025

(54) MEMORY WITH ARRAYS OF SENSE AMPLIFIERS AND TWO ERROR CHECKING AND CORRECTION (ECC) MODULES

(71) Applicant: CHANGXIN MEMORY TECHNOLOGIES, INC., Hefei (CN)

(72) Inventors: Weibing Shang, Hefei (CN); Yicheng Gao, Hefei (CN); Hangtian Ba, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 169 days.

(21) Appl. No.: 18/364,060

(22) Filed: Aug. 2, 2023

(65) Prior Publication Data
US 2024/0071555 A1 Feb. 29, 2024

Related U.S. Application Data

(63) Continuation of application No. PCT/CN2022/123944, filed on Oct. 9, 2022.

(30) Foreign Application Priority Data

Aug. 23, 2022 (CN) .......................... 202211013658.7

(51) Int. Cl.
*G11C 29/52* (2006.01)
*G11C 7/12* (2006.01)
*G11C 7/18* (2006.01)

(52) U.S. Cl.
CPC ................ *G11C 29/52* (2013.01); *G11C 7/12* (2013.01); *G11C 7/18* (2013.01)

(58) Field of Classification Search
CPC .. G11C 29/52; G11C 7/12; G11C 7/18; G11C 2029/0411; G11C 5/025; H10B 12/09; H10B 12/482
See application file for complete search history.

(56) References Cited

U.S. PATENT DOCUMENTS 7,603,592 B2 * 10/2009 Sekiguchi ........... G06F 11/1044
714/763
8,068,379 B1 * 11/2011 Takahashi ........... G11C 11/4085
365/230.06

(Continued)

FOREIGN PATENT DOCUMENTS

| CN | 112416108 A | 2/2021 |
|---|---|---|
| CN | 112820333 A | 5/2021 |

(Continued)

OTHER PUBLICATIONS

International Search Report cited in PPCT/CN2022/123944 mailed Dec. 20, 2022, 8 pages.

*Primary Examiner* — Sultana Begum
(74) *Attorney, Agent, or Firm* — Syncoda LLC; Feng Ma

(57) ABSTRACT

The present disclosure provides a memory and a memory system thereof, relating to the technical field of semiconductors. The memory includes: memory sections and a plurality of bit lines (BLs) corresponding to a same memory section; sense amplifiers electrically connected to the plurality of BLs in one-to-one correspondence, where two of the sense amplifiers corresponding to adjacent two of the BLs are located on two sides of the memory section; and a first error checking and correction (ECC) module and a second ECC module, where one of two adjacent sense amplifiers located on a same side of the memory section is electrically connected to the first ECC module, and the other one of the two adjacent sense amplifiers located on the same side of the memory section is electrically connected to the second ECC module.

9 Claims, 6 Drawing Sheets

(56) References Cited

U.S. PATENT DOCUMENTS

| | | |
|---|---|---|
| 11,087,824 B2 | 8/2021 | Montierth et al. |
| 11,114,180 B1 | 9/2021 | Lin et al. |
| 11,276,442 B2 | 3/2022 | Ito et al. |
| 11,416,333 B2 | 8/2022 | Lam et al. |
| 2017/0161143 A1 | 6/2017 | Reed et al. |
| 2022/0277785 A1 | 9/2022 | Chi et al. |

FOREIGN PATENT DOCUMENTS

| | | |
|---|---|---|
| CN | 113113058 A | 7/2021 |
| CN | 114078522 A | 2/2022 |
| CN | 114203230 A | 3/2022 |

* cited by examiner

MEMORY WITH ARRAYS OF SENSE AMPLIFIERS AND TWO ERROR CHECKING AND CORRECTION (ECC) MODULES

CROSS-REFERENCE TO RELATED APPLICATIONS

This is a continuation of International Patent Application No. PCT/CN2022/123944, filed on Oct. 9, 2022, which claims priority to Chinese Patent Application No. 202211013658.7, titled "MEMORY AND MEMORY SYSTEM THEREOF" and filed on Aug. 23, 2022. The disclosures of International Patent Application No. PCT/CN2022/123944 and Chinese Patent Application No. 202211013658.7 are incorporated herein by reference in their entireties.

TECHNICAL FIELD

The present disclosure relates to, but is not limited to, a memory and a memory system thereof.

BACKGROUND

A memory device stores information by programming through different states of memory cells. The memory devices can be classified into a magnetic hard disk, a random access memory (RAM), a read only memory (ROM), a static RAM (SRAM), a dynamic RAM (DRAM), a synchronous dynamic RAM (SDRAM), etc. The development of memory technology imposes higher integration density requirement on the memory device, and the defect density of the memory cells caused by a short circuit in the memory cells becomes a bottleneck in the improvement of the integration density of the memory device.

At present, there are redundant rows or columns in the memory device, which are configured to repair defects generated during production of the memory device. The repair of a column redundancy circuit is usually limited within a small range. When a defective column address is accessed, it is replaced with a redundant column address, to finish the repair. However, for a memory using an advanced process, especially when the process is in an early development stage, the process is not yet stable, and the number of defects may be far greater than the number of redundant rows or columns. Accordingly, an error checking and correction (ECC) circuit may be added to the memory device. That is, the memory device includes an ECC algorithm configured to check and/or correct, in some cases, bit errors in the memory cells due to, for example, a short circuit between the memory cells.

However, for the ECC circuit, the more the number of bits of errors to be checked and corrected, the higher the complexity of the ECC circuit, and the higher the preparation cost of the ECC circuit. The layout area of the ECC circuit in the memory device and the time taken for the ECC circuit to check and correct the errors both increase exponentially with the increase of the number of bits of the errors checked and corrected.

SUMMARY

An overview of the subject described in detail in the present disclosure is provided below, which is not intended to limit the protection scope of the claims.

A first aspect of the present disclosure provides a memory, including: memory sections and a plurality of bit lines (BLs) corresponding to a same memory section; sense amplifiers electrically connected to the plurality of BLs in one-to-one correspondence, where two of the sense amplifiers corresponding to adjacent two of the BLs are located on two sides of the memory section; and a first ECC module and a second ECC module, where one of two adjacent sense amplifiers located on a same side of the memory section is electrically connected to the first ECC module, and the other one of the two adjacent sense amplifiers located on the same side of the memory section is electrically connected to the second ECC module.

A second aspect of the present disclosure provides a memory system, including the memory according to the first aspect of the present disclosure.

Other aspects of the present disclosure are understandable upon reading and understanding of the accompanying drawings and detailed description.

BRIEF DESCRIPTION OF THE DRAWINGS

The accompanying drawings incorporated into the specification and constituting a part of the specification illustrate the embodiments of the present disclosure, and are used together with the description to explain the principles of the embodiments of the present disclosure. In these accompanying drawings, similar reference numerals represent similar elements. The accompanying drawings in the following description illustrate some rather than all of the embodiments of the present disclosure. Those skilled in the art may obtain other accompanying drawings based on these accompanying drawings without creative efforts.

REFERENCE NUMERALS

100. Active region; 101. Memory section; 101a. Word line; 102. Bit line (BL); 103. Sense amplifier; 110. Capacitor structure; 111. First region; 112. First BL; 113. First sense amplifier; 114. First ECC module; 115. First BL selection module; 120. Contact region; 121. Second region; 122. Second BL; 123. Second sense amplifier; 124. Second ECC module; 125. Second BL selection module; 130. Memory cell; 131. Third region; 132. Third BL; 140. First dashed box; 141. Fourth region; 142. Fourth BL; 150. Second dashed box; 151. First spacer region; 152. First reference BL; 161. Second spacer region; 162. Second reference BL; and 171. Third spacer region.

DETAILED DESCRIPTION

The technical solutions in the embodiments of the present disclosure are described below clearly and completely referring to the accompanying drawings in the embodiments of the present disclosure. Apparently, the described embodiments are merely some rather than all of the embodiments of the present disclosure. All other embodiments obtained by those skilled in the art based on the embodiments of the present disclosure without creative efforts should fall within the protection scope of the present disclosure. It should be noted that the embodiments in the present disclosure and features in the embodiments may be combined with each other in a non-conflicting manner.

In can be seen from the background that the preparation cost of the memory needs to be reduced, and the ECC capabilities of the first ECC module and the second ECC module for the memory need to be enhanced.

Figure 1:
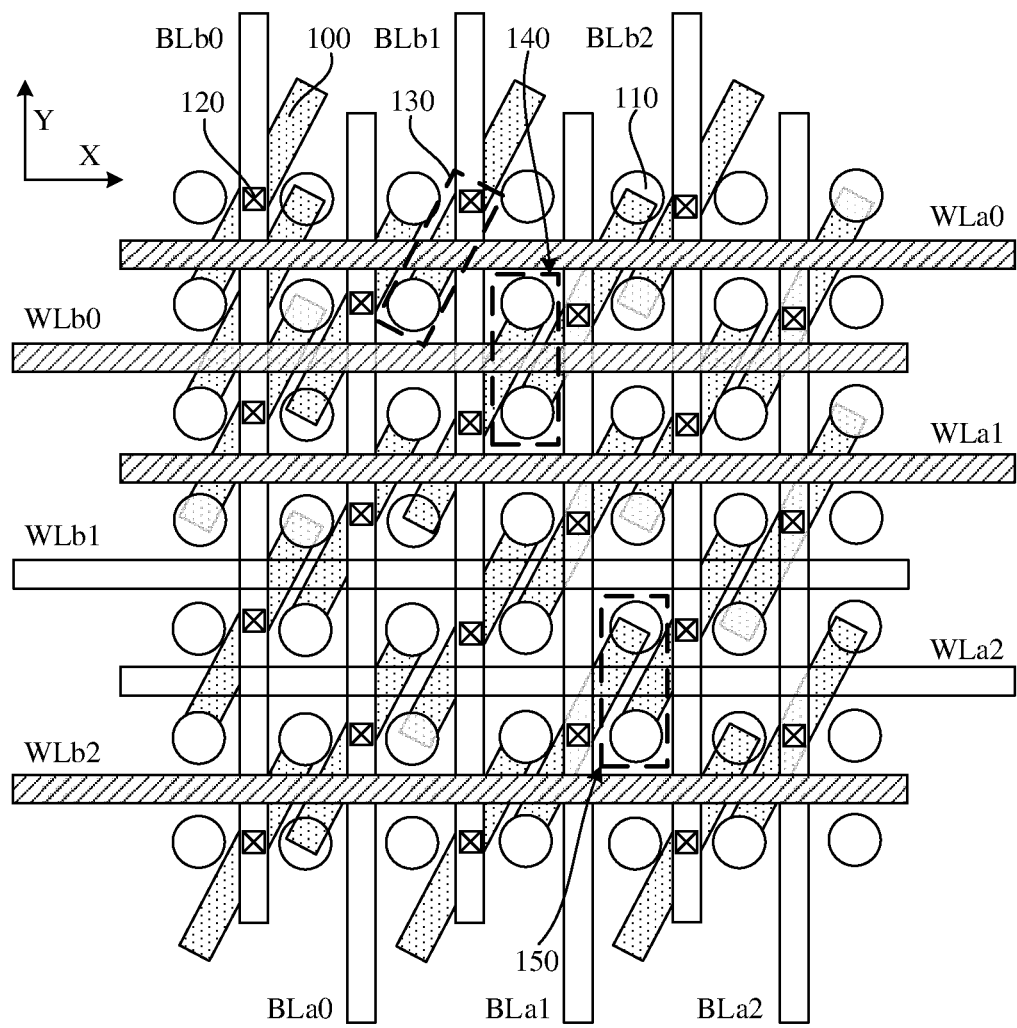
FIG. 1 is a top schematic structural diagram of a part of a memory.

FIG. 1 is a top schematic structural diagram of a part of a memory. It should be noted that, in order to clearly display the positional relationship of each structure in the memory, some structures are drawn in a perspective manner.

Referring to FIG. 1, the memory includes a plurality of word lines extending along a first direction X and arranged at intervals along a second direction Y, and a plurality of BLs extending along the second direction Y and arranged at intervals along the first direction X. Six BLs are respectively marked as BLa0, BLa1, BLa2, BLb0, BLb1 and BLb2 in the figure. The memory further includes a plurality of active regions 100 arranged in an array, and a plurality of capacitor structures 110 arranged in an array. The capacitor structures 110 are located at two ends of the active region 100. One active region 100 corresponds to one BL and two word lines.

Referring to FIG. 1, for any BL, one BL includes a plurality of contact regions 120 configured to connect the BL and the active regions 100. A single memory cell 130 includes a segment of the BL, a segment of the word line, and a segment of the active region 100.

After analysis, it is found that as the integration density of the memory cells 130 in the memory becomes higher and higher, interference between adjacent memory cells 130 or defects in the preparation process are more likely to occur, thereby resulting in data errors stored in the adjacent memory cells 130. In one example, referring to a first dashed box 140, a spacing between two capacitor structures 110 corresponding to adjacent BLs, namely BLb1 and BLa1, is very small, and the problem of mutual interference is likely to occur, for example, a short circuit occurs between the two capacitor structures 110. In another example, referring to the first dashed box 140 and the second dashed box 150, when a process for preparing the memory further reduces the size of related structures in the memory, especially in the early stage of the process, the probability of problems of the memory cells corresponding to the adjacent BLs further increases, and there may also be a problem of associative errors in the memory cells corresponding to adjacent continuous three or four BLs, for example, three adjacent BLs, namely BLb1, BLa1 and BLb2 shown in the first dashed box 140 and the second dashed box 150. In particular, when the memory cells corresponding to a plurality of adjacent BLs controlled by a same memory section has a correlation error, the ECC circuit, namely an ECC module needs a large time and cost to check and correct this type of errors.

Therefore, with the increase of the integration density of the memory cells 130 in the memory, the probability of stored data errors due to interference between adjacent memory cells 130 increases, and there is a need for a memory that can satisfy the ECC capability without occupying too large area and reduce the time spent on ECC.

The embodiments of the present disclosure provide a memory and a memory system thereof. Some of the BLs in the memory, some of the word lines in the memory section, and transistor structures constitute a single memory cell. The sense amplifiers are in one-to-one correspondence with different BLs corresponding to a same word line. By arranging two of the sense amplifiers corresponding to adjacent two of the BLs on two sides of the memory section, it is beneficial to increase the spacing between the sense amplifiers corresponding to the adjacent BLs and avoid mutual interference between the sense amplifiers corresponding to the adjacent BLs due to a too small spacing, thereby improving the accuracy of data amplification. Moreover, the first ECC module and the second ECC module independent of each other are arranged in the memory, such that one of two adjacent sense amplifiers located on a same side of the memory section is electrically connected to the first ECC module, and the other one of the two adjacent sense amplifiers located on the same side of the memory section is electrically connected to the second ECC module. That is, different ECC modules are employed to perform ECC on two adjacent sense amplifiers located on a same side of the memory section, which helps to reduce the number of memory cells that need to be checked and corrected by a single ECC module when a plurality of adjacent memory cells make errors at the same time, thereby helping to reduce the complexity of the first ECC module and the second ECC module to reduce the layout area of a single ECC module in the memory and reduce the time taken for a single ECC module to check and correct data stored in the memory cells, thus helping to ensure that the ECC capabilities of the first ECC module and the second ECC module can meet the requirements of the memory while ensuring lower preparation cost of the memory.

An embodiment of the present disclosure provides a memory. The memory according to an embodiment of the present disclosure is described in detail below with reference to the accompanying drawings. FIG. 2 to FIG. 6 are schematic structural diagrams of a memory according to an embodiment of the present disclosure. It should be noted that, in order to facilitate describing and clearly illustrating the characteristics of the memory, FIG. 2 to FIG. 6 in an embodiment of the present disclosure are all schematic structural diagrams of a part of the memory.

It should be noted that, for simplicity of illustration, one memory section 101 is represented by one word line 101a in FIG. 2 to FIG. 6.

Referring to FIG. 2 to FIG. 6, the memory includes: memory sections 101 and a plurality of BLs 102 corresponding to a same memory section 101; sense amplifiers 103 electrically connected to the plurality of BLs 102 in one-to-one correspondence, where two sense amplifiers 103 corresponding to adjacent BLs 102 are located on two sides of the memory section 101; and a first ECC module 114 and a second ECC module 124, where one of two adjacent sense amplifiers 103 located on a same side of the memory section 101 is electrically connected to the first ECC module 114, and the other one of the two adjacent sense amplifiers 103 located on the same side of the memory section 101 is electrically connected to the second ECC module 124.

Figure 2:
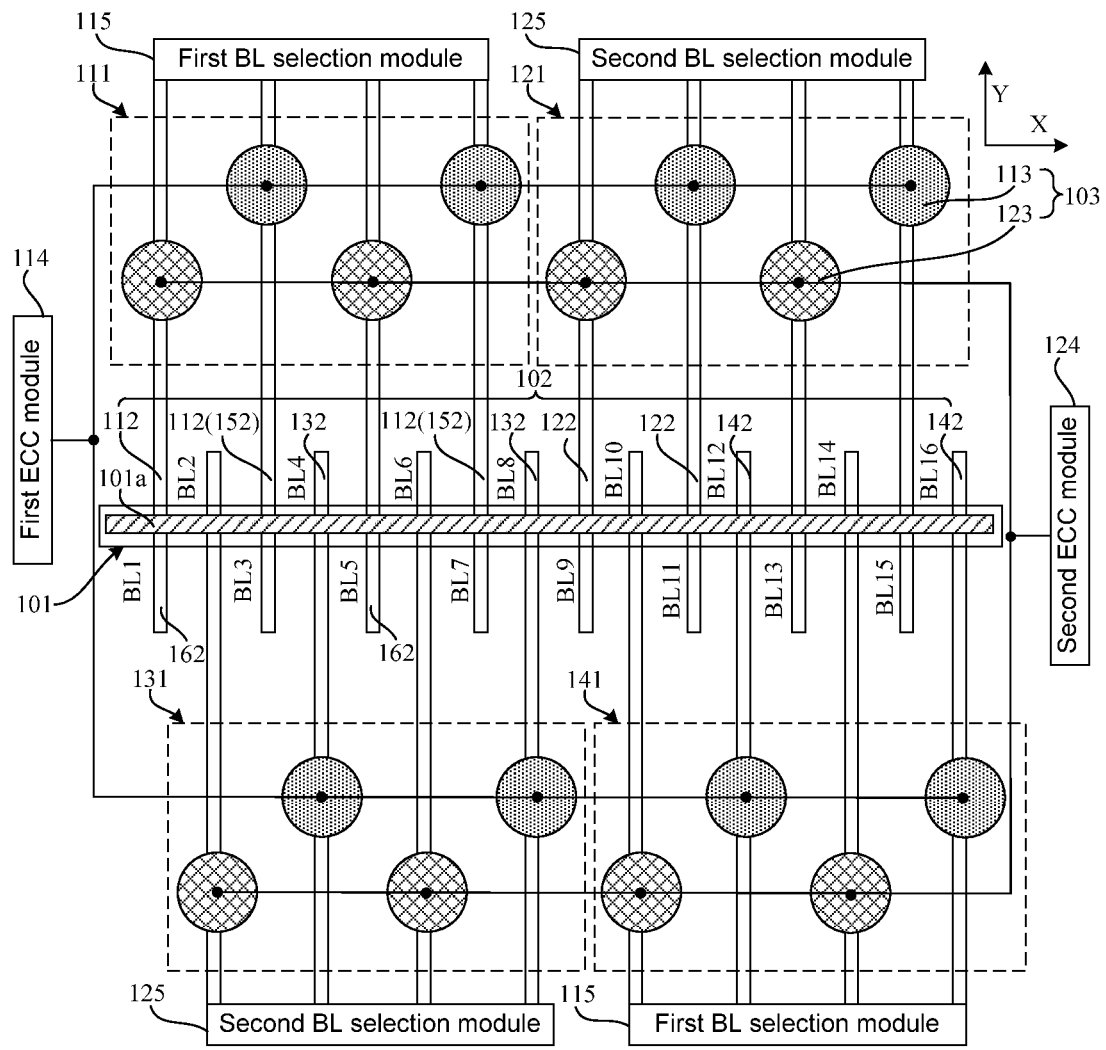
FIG. 2 is a schematic structural diagram of a memory according to an embodiment of the present disclosure.

It can be understood that because there is only one word line 101a to be turned on at a same moment, only one word line 101a is taken as an example in FIG. 2. However, in an actual memory, each memory bank includes a plurality of memory sections 101, and a sense amplifier (SA) is provided between adjacent memory sections 101. each memory section 101 includes a plurality of word lines 101a, and the BLs 102 connected to different word lines 101a are the same. That is to say, the positional relationship of each word line 101a, the BLs 102 corresponding the word line 101a, and the sense amplifiers 103 can be referred to FIG. 2. For simplicity of illustration, the present disclosure takes one word line 101a as an example for description. When performing data amplification, the sense amplifier 103 takes the BL 102 connected to the memory cell to be read and written as a target BL, and takes the corresponding BL 102 in another adjacent memory cell 101 as a reference BL. The memory section 101 in which the memory cell to be read and written and the memory section 101 including the reference BL are located on two opposite sides of the sense amplifier 103. Along an extension direction perpendicular to the memory section 101, namely the second direction Y, two sides of the memory section 101 refer to opposite sides of the memory section in the second direction Y. Thus, two sense amplifiers 103 corresponding to adjacent BLs 102 are located on two sides of the memory section 101, which is beneficial to reduce the spacing between adjacent sense amplifiers 103 located on a same side of the memory section 101 and avoid mutual interference between the adjacent sense amplifiers 103 due to a too small spacing, thereby improving the accuracy of data amplification.

Moreover, the first ECC module 114 and the second ECC module 124 independent of each other are arranged in the memory, such that one of two adjacent sense amplifiers 103 located on a same side of the memory section 101 is electrically connected to the first ECC module 114, and the other one of the two adjacent sense amplifiers 103 located on the same side of the memory section 101 is electrically connected to the second ECC module 124. That is, different ECC modules are employed to perform ECC on two adjacent sense amplifiers 103 located on a same side of the memory section 101, which helps to reduce the number of memory cells that need to be checked and corrected by a single ECC module when a plurality of adjacent memory cells make errors at the same time, thereby helping to reduce the complexity of the first ECC module 114 and the second ECC module 124, reducing the layout area of a single ECC module in the memory, and reducing the time taken for a single ECC module to check and correct data stored in the memory cells, thus helping to ensure that the ECC capabilities of the first ECC module 114 and the second ECC module 124 can meet the requirements of the memory while ensuring lower preparation cost of the memory.

It can be understood that, the ECC module configured to check and correct random storage or read errors of individual memory cells is relatively low in complexity, and the first ECC module 114 and the second ECC module 124 may both be an ECC module to check a single error, which is beneficial to further reduce the complexity of the first ECC module 114 and the second ECC module 124 to reduce the layout space of the first ECC module 114 and the second ECC module 124 in the memory, reduce the preparation cost of the first ECC module 114 and the second ECC module 124 and shorten the time of the first ECC module 114 and the second ECC module 124 spent on ECC, thus helping to ensure that the ECC capabilities of the first ECC module 114 and the second ECC module 124 can meet the requirements of the memory while ensuring lower preparation cost of the memory.

It should be noted that the sense amplifier 103 is illustrated in two filling patterns in FIG. 2 to FIG. 6, for example, the first sense amplifier 113 and the second sense amplifier 123. The sense amplifiers 103 having the same filling pattern are connected to a same ECC module. An example where the first sense amplifier 113 is electrically connected to the first ECC module 114 and the second sense amplifier 123 is connected to the second ECC module 124 is taken in FIG. 2 to FIG. 6. Or, in actual applications, the first sense amplifier 113 may be electrically connected to the second ECC module 124 and the second sense amplifier 123 may be connected to the first ECC module 114.

The embodiments of the present disclosure are described in more detail below with reference to the accompanying drawings.

In some embodiments, referring to FIG. 2 to FIG. 6, the sense amplifier 103 electrically connected to the BL 102 is located in the extension direction of the BL 102, namely the second direction Y. In this way, the physical location of the BL 102 in the memory corresponds to that of the sense amplifier 103 electrically connected to the BL 102 in the memory. That is, the BL 102 and the corresponding sense amplifier 103 correspond to a same segment of the memory section 101. In the first direction X, the arrangement sequence of a plurality of BLs 102 is consistent with that of a plurality of sense amplifiers 103.

In one example, referring to FIG. 2, along the extension direction of the memory section 101, namely the first direction X, eight BLs 102 are sequentially arranged on a side of the memory section 101: BL1, BL3, BL5, BL7, BL9, BL11, BL13 and BL15; and the arrangement sequence of eight sense amplifiers 103 on this side corresponding to the eight BLs 102 is consistent with that of the eight BLs 102. Eight BLs 102 located on the other side of the memory section 101 are sequentially arranged: BL2, BL4, BL6, BL8, BL10, BL12, BL14 and BL16; and the arrangement sequence of eight sense amplifiers 103 on this side corresponding to the eight BLs 102 is consistent with that of the eight BLs 102.

In some embodiments, referring to FIG. 2 to FIG. 6, the memory section 101 has a first side and a second side opposite to each other, a region in which the sense amplifiers 103 being in the first side are located includes a first region 111 and a second region 121, and a region in which the sense amplifiers 103 being in the second side are located includes a third region 131 and a fourth region 141, where the first region 111 directly faces the third region 131, and the second region 121 directly faces the fourth region 141.

It can be understood that, the first region 111 directly faces the third region 131, indicating that the BLs 102 corresponding to the sense amplifiers 103 in the first region 111 and the BLs 102 corresponding to the sense amplifiers 103 in the third region 131 are alternately arranged along the first direction X. In one example, referring to FIG. 2, the BLs 102 corresponding to the sense amplifiers 103 in the first region 111 include BL1, BL3, BL5 and BL7. The BLs 102 corresponding to the sense amplifiers 103 in the third region 131 include BL2, BL4, BL6 and BL8. The eight BLs 102 corresponding to the sense amplifiers 103 in the first region 111 and the third region 131 are sequentially arranged in the first direction X: BL1, BL2, BL3, BL4, BL5, BL6, BL7 and BL8.

The second region 121 directly faces the fourth region 141, indicating that the BLs 102 corresponding to the sense amplifiers 103 in the second region 121 and the BLs 102 corresponding to the sense amplifiers 103 in the fourth region 141 are alternately arranged along the first direction X. In one example, referring to FIG. 2, the BLs 102 corresponding to the sense amplifiers 103 in the second region 121 include BL9, BL11, BL13 and BL15. The BLs 102 corresponding to the sense amplifiers 103 in the fourth region 141 include BL10, BL12, BL14 and BL16. The eight BLs 102 corresponding to the sense amplifiers 103 in the second region 121 and the fourth region 141 are sequentially arranged in the first direction X: BL9, BL10, BL11, BL12, BL13, BL14, BL15 and BL16.

Still referring to FIG. 2 to FIG. 6, the memory may further include a first BL selection module 115 and a second BL selection module 125, where the BLs 102 corresponding to the sense amplifiers 103 in the first region 111 and the fourth region 141 are controlled to be turned on by the first BL selection module 115, the BLs 102 corresponding to the sense amplifiers 103 in the second region 121 and the third region 131 are controlled to be turned on by the second BL selection module 125, and one of the first BL selection module 115 and the second BL selection module 125 is enabled.

In this way, on the one hand, two adjacent BLs 102 corresponding to a same memory section 101, such as BL1 and BL2, are respectively controlled to be turned on by different BL selection modules. That is, the sense amplifiers 103 corresponding to the two adjacent BLs 102 cannot be in an operating state at the same time, and the memory cells corresponding to the two adjacent BLs 102 cannot perform a data reading or storage operation at the same time. Therefore, the ECC module is not required to synchronously perform ECC on the memory cells corresponding to the two adjacent BLs 102 during data reading or storage, thereby helping to reduce the complexity of the ECC module configured for the memory. On the other hand, adjacent BLs 102 located on a same side of the memory section 101, such as BL1 and BL3, are electrically connected to different ECC modules. Therefore, when the memory cells corresponding to the adjacent BLs 102 located on a same side of the memory section 101 have a data reading or storage error at the same time, the first ECC module 114 and the second ECC module 124 can respectively perform ECC on the memory cells having an error at the same time, thereby further reducing the complexity of the ECC modules.

In some embodiments, referring to FIG. 2, the first region 111 is adjacent to the second region 121, the third region 131 is adjacent to the fourth region 141, the BLs 102 electrically connected to the sense amplifiers 103 in the second region 121 are taken as second BLs 122, the BLs 102 electrically connected to the sense amplifiers 103 in the third region 131 are taken as third BLs 132, one of the second BLs 122 is adjacent to one of the third BLs 132, one of the second BL 122 and the third BL 132 adjacent to each other is connected to the first ECC module 114, and the other one of the second BL 122 and the third BL 132 adjacent to each other is connected to the second ECC module 124. In this way, the second BL 122 and the third BL 132 adjacent to each other are controlled to be turned on by the second BL selection module 125, but the sense amplifiers 103 corresponding to the second BL 122 and the third BL 132 adjacent to each other are electrically connected to different ECC modules. Therefore, when the memory cells corresponding to the second BL 122 and the third BL 132 adjacent to each other have a data reading or storage error at the same time, the first ECC module 114 and the second ECC module 124 can respectively perform ECC on the memory cells having an error at the same time.

Referring to FIG. 2, the second BL 122 may include BL9, BL11, BL13 and BL15, and the third BL 132 may include BL2, BL4, BL6 and BL8. One second BL 122 is adjacent to one third BL 132, which may be that BL9 is adjacent to BL8. In this way, BL9 and BL8 are controlled to be turned on by the second BL selection module 125, but the sense amplifiers 103 corresponding to BL9 and BL8 are electrically connected to different ECC modules. The first ECC module 114 and the second ECC module 124 can respectively perform ECC on the memory cells corresponding to BL9 and BL8.

Figure 3:
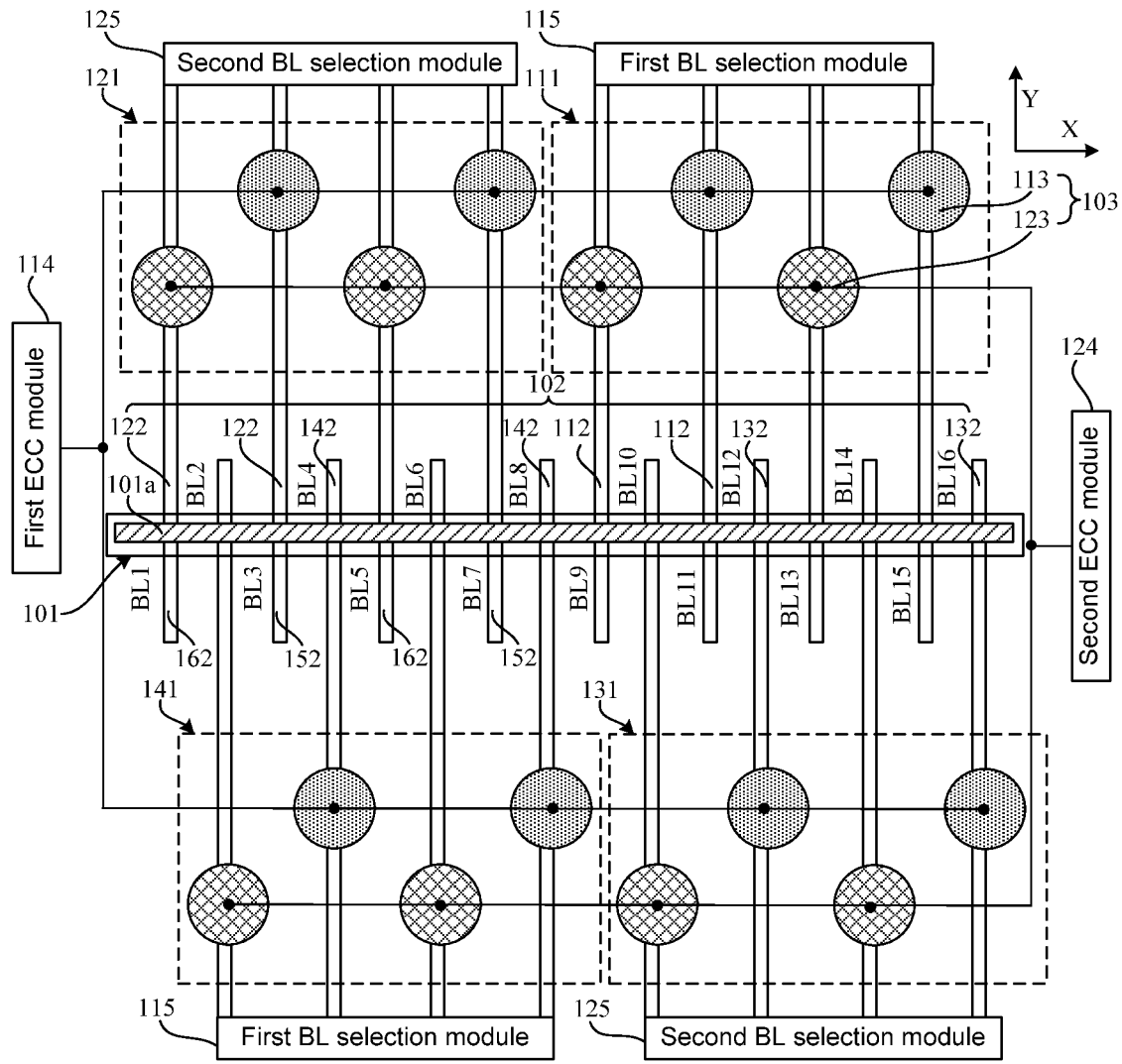
FIG. 3 is a schematic structural diagram of a memory according to an embodiment of the present disclosure.

In some embodiments, referring to FIG. 3, the first region 111 is adjacent to the second region 121, the third region 131 is adjacent to the fourth region 141, the BLs 102 electrically connected to the sense amplifiers 103 in the first region 111 are taken as first BLs 112, the BLs 102 electrically connected to the sense amplifiers 103 in the fourth region 141 are taken as fourth BLs 142, one of the first BLs 112 is adjacent to one of the fourth BLs 142, one of the first BL 112 and the fourth BL 142 adjacent to each other is connected to the first ECC module 114, and the other one of the first BL 112 and the fourth BL 142 adjacent to each other is connected to the second ECC module 124. In this way, the first BL 112 and the fourth BL 142 adjacent to each other are controlled to be turned on by the first BL selection module 115, but the sense amplifiers 103 corresponding to the first BL 112 and the fourth BL 142 adjacent to each other are electrically connected to different ECC modules. Therefore, when the memory cells corresponding to the first BL 112 and the fourth BL 142 adjacent to each other have a data reading or storage error at the same time, the first ECC module 114 and the second ECC module 124 can respectively perform ECC on the memory cells having an error at the same time.

It should be noted that in FIG. 2 and FIG. 3, the first sense amplifier 113 is electrically connected to the first ECC module 114, and the second sense amplifier 123 is connected to the second ECC module 124. Or, in actual applications, the first sense amplifier 113 may be electrically connected to the second ECC module 124, and the second sense amplifier 123 may be connected to the first ECC module 114.

Referring to FIG. 3, the first BL 112 may include BL9, BL11, BL13 and BL15, and the fourth BL 142 may include BL2, BL4, BL6 and BL8. One first BL 112 is adjacent to one fourth BL 142, which may be that BL9 is adjacent to BL8.

Figure 4:
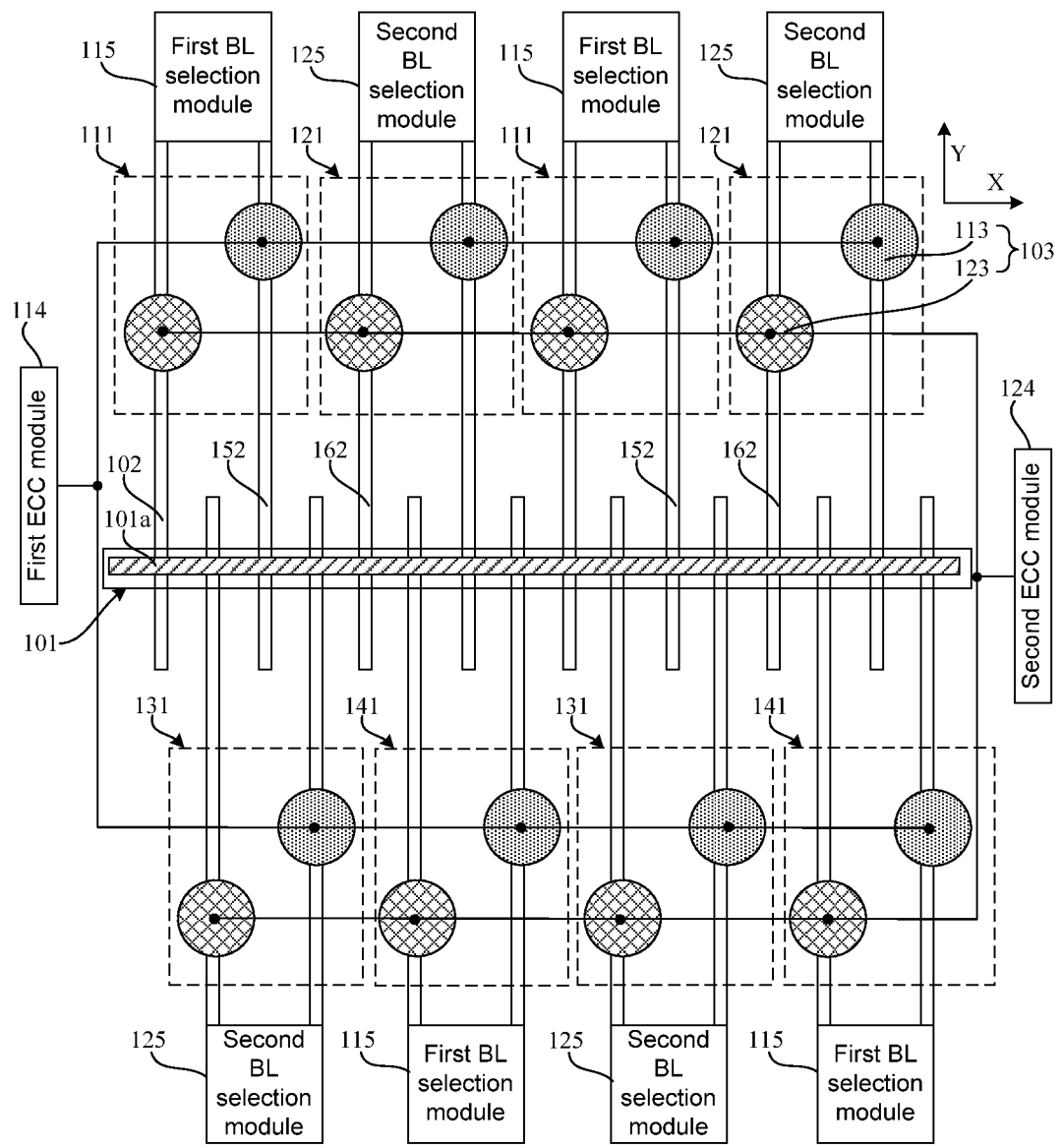
FIG. 4 is a schematic structural diagram of a memory according to an embodiment of the present disclosure.

In some embodiments, referring to FIG. 4, along an extension direction X of the memory section 101, a plurality of the first regions 111 and a plurality of the second regions 121 are alternately arranged, and a plurality of the third regions 131 and a plurality of the fourth regions 141 are alternately arranged. The first regions 111 and the second regions 121 are alternately arranged, and the third regions 131 and the fourth regions 141 are alternately arranged. The first region 111 directly faces the third region 131, and the second region 121 directly faces the fourth region 141, thereby controlling two adjacent BLs 102 in the first region 111 and the third region 131 by different BL selection modules, and controlling two adjacent BLs 102 in the second region 121 and the fourth region 141 by different BL selection modules.

It can be understood that, in the memory according to an embodiment of the present disclosure, there is no limit to the numbers of first regions 111 and second regions 121 divided in the region in which the sense amplifier 103 being in the first side of the memory section 101 are located, and it is only necessary to alternately arrange the first regions 111 and the second regions 121; and there is no limit to the numbers of third regions 131 and fourth regions 141 divided in the region in which the sense amplifier 103 being in the second side of the memory section 101 are located, and it is only necessary to alternately arrange the third regions 131 and the fourth regions 141.

In some embodiments, there are M sense amplifiers 103 in the first region 111 and the third region 131, and there are N sense amplifiers 103 in the second region 121 and the fourth region 141, where M is a positive integer greater than or equal to 2, and N is a positive integer greater than or equal to 2.

In one example, referring to FIG. 2 or FIG. 3, there are four sense amplifiers 103 in the first region 111 and the third region 131, and there are also four sense amplifiers 103 in the second region 121 and the fourth region 141. In another example, referring to FIG. 4, there are two sense amplifiers 103 in the first region 111 and the third region 131, and there are also two sense amplifiers 103 in the second region 121 and the fourth region 141. In another embodiment, referring to FIG. 5, there are three sense amplifiers 103 in the first region 111 and the third region 131, and there are also three sense amplifiers 103 in the second region 121 and the fourth region 141.

Figure 5:
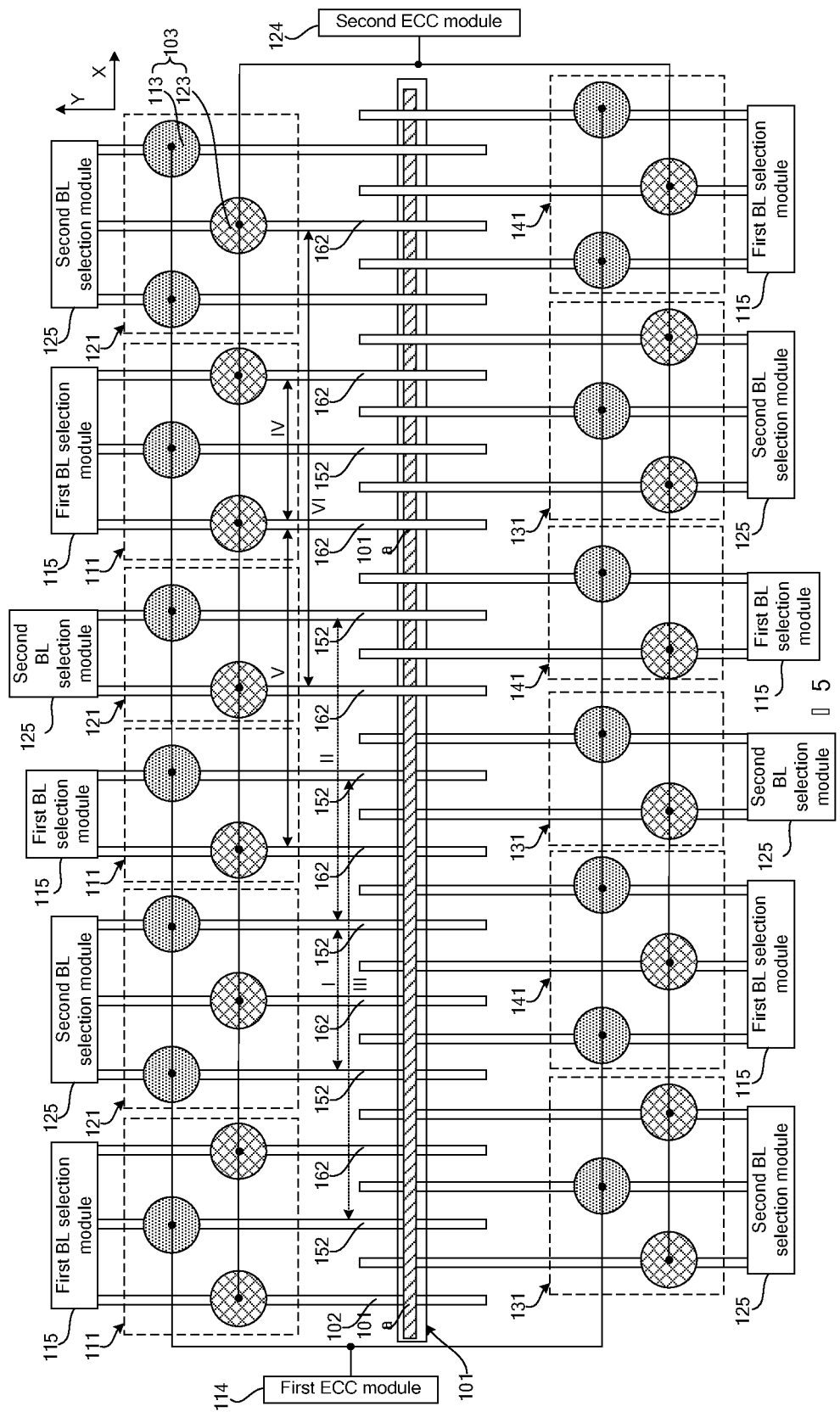
FIG. 5 is a schematic structural diagram of a memory according to an embodiment of the present disclosure.

In addition, referring to FIG. 5, in some embodiments, there may be different numbers of sense amplifiers 103 located in a plurality of first regions 111 on the first side of the memory section 101, there may be different numbers of sense amplifiers 103 located in a plurality of first regions 111 on the second side of the memory section 101, it is only necessary to meet the situation that the number of sense amplifiers 103 in the third region 131 directly facing a certain first region 111 is equal to the number of sense amplifiers 103 in the first region 111. In one example, still referring to FIG. 5, if the first region 111 includes three sense amplifiers 103, and the third region 131 directly facing the first region 111 also includes three sense amplifiers 103; and if another first region 111 includes two sense amplifiers 103, and the third region 131 directly facing the another first region 111 also includes two sense amplifiers 103. In actual applications, there may be different numbers of sense amplifiers 103 located in a plurality of second regions 121 on the first side of the memory section 101, there may be different numbers of sense amplifiers 103 located in a plurality of fourth regions 141 on the second side of the memory section 101, it is only necessary to meet the situation that the number of sense amplifiers 103 in the fourth region 141 directly facing a certain second region 121 is equal to the number of sense amplifiers 103 in the second region 121.

In some embodiments, referring to FIG. 2 to FIG. 4 and FIG. 6, M is equal to N. In this way, it is beneficial to reduce a difference between the number of the first region 111 and the third region 131 and the number of the second region 121 and the fourth region 141, thereby reducing the difference between the number of the first BL selection module 115 and the number of the second BL selection module 125, and balancing the numbers of BLs 102 respectively controlled by the first BL selection module 115 and the second BL selection module 125 to balance the operating loads of the first BL selection module 115 and the second BL selection module 125.

It should be noted that there are the same number of sense amplifiers 103 in at least part of the first region 111 and part of the second region 121 in FIG. 2 to FIG. 6. Or, there are the same number of sense amplifiers 103 in the first region 111 and the second region 121 which are not repeated and adjacent to each other (referring to FIG. 5). There may be different numbers of sense amplifiers 103 in different first regions 111, and there may be different numbers of sense amplifiers 103 in different second regions 121. In actual applications, M may also be unequal to N. That is, the number of sense amplifiers 103 in the first region 111 and the third region 131 is different from the number of sense amplifiers 103 in the second region 121 and the fourth region 141. However, there are the same number of sense amplifiers 103 in different first regions 111, and there are the same number of sense amplifiers 103 in different second regions 121.

Figure 6:
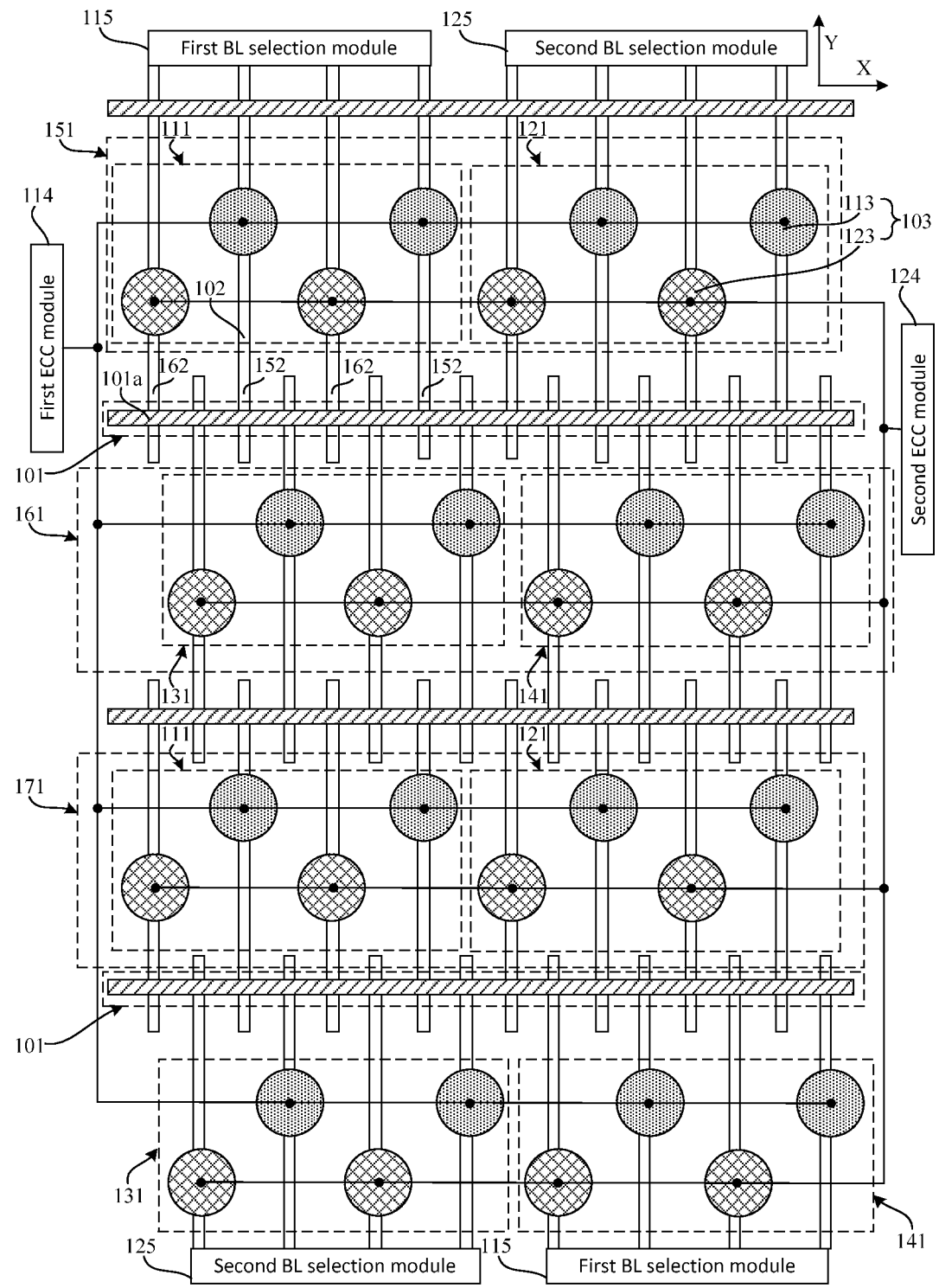
FIG. 6 is a schematic structural diagram of a memory according to an embodiment of the present disclosure.

In some embodiments, referring to FIG. 6, a plurality of the memory sections 101 are arranged at intervals along the extension directions Y of the BLs 102, where a first spacer region 151, a second spacer region 161 and a third spacer region 171 are sequentially arranged between adjacent four memory sections 101, the first spacer region 151 and the third spacer region 171 include the first region 111 and the second region 121, and the second spacer region 161 includes the third region 131 and the fourth region 141.

It can be understood that there are two division modes for the sense amplifiers 103 between adjacent memory sections 101, i.e., dividing into the first region 111 and the second region 121 or dividing into the third region 131 and the fourth region 141, and in the two division modes, the sense amplifiers are alternately arranged in spacings between the plurality of adjacent memory sections 101.

In some embodiments, referring to FIG. 2 to FIG. 6, in the sense amplifiers 103 located on a same side of the memory section 101, the BLs 102 corresponding to the sense amplifiers 103 electrically connected to the first ECC module 114 are first reference BLs 152, and the BLs 102 corresponding to the sense amplifiers 103 electrically connected to the second ECC module 124 are second reference BLs 162, there are at least three BLs 102 between adjacent first reference BLs 152, and there are at least three BLs 102 between adjacent second reference BLs 162.

In one example, referring to FIG. 2, FIG. 3 or FIG. 6, in the BLs 102 connected to the sense amplifiers 103 located on a same side of the memory section 101, for the BLs 102 controlled to be turned on by a same BL module, no matter the first reference BLs 152 or the second reference BLs 162, there are three BLs 102 between adjacent first reference BLs 152, and there are three BLs 102 between adjacent second reference BLs 162.

In another example, referring to FIG. 4, in the BLs 102 connected to the sense amplifiers 103 located on a same side of the memory section 101, for the BLs 102 controlled to be turned on by a same BL module, no matter the first reference BLs 152 or the second reference BLs 162, there are seven BLs 102 between adjacent first reference BLs 152, and there are seven BLs 102 between adjacent second reference BLs 162.

In another example, referring to FIG. 5, in the BLs 102 connected to the sense amplifiers 103 located on a same side of the memory section 101, for the BLs 102 controlled to be turned on by a same BL module, referring to an arrow I, there are three BLs between adjacent first reference BLs 152; or, referring to an arrow II, there are seven BLs between adjacent first reference BLs 152; or referring to an arrow III, there are eleven BLs between adjacent first reference BLs 152. Referring to an arrow IV, there are three BLs between adjacent second reference BLs 162; or, referring to an arrow V, there are seven BLs between adjacent second reference BLs 162; or, referring to an arrow VI, there are eleven BLs between adjacent second reference BLs 162. It should be noted that FIG. 5 is merely an example. In actual applications, as the number of sense amplifiers 103 included in the first region 111 and the second region 121 adjacent to each other changes, the number of BLs between adjacent first reference BLs 152 and the number of BLs between adjacent second reference BLs 162 also change accordingly.

It can be understood that, in the BLs 102 connected to the sense amplifiers 103 located on a same side of the memory section 101, the farther the spacing between the BLs 102 controlled to be turned on by a same BL module is, the farther the spacing between the corresponding sense amplifiers 103. In this way, when the BLs 102 controlled to be turned on by a same BL module are turned on at the same time, it is beneficial to reduce the probability of mutual interference between the corresponding sense amplifiers 103, i.e., reducing the interference during data amplification. In an embodiment of the present disclosure, the numbers of sense amplifiers 103 in the first region 111, the second region 121, the third region 131 and the fourth region 141 can be flexibly set, to adjust the layout of the BLs 102 corresponding to the sense amplifiers 103, to adjust the number of the BLs 102 between the adjacent first reference BLs 152, and to adjust the number of the BLs 102 between the adjacent second reference BLs 162.

It should be noted that in FIG. 2 to FIG. 6, taking an example where the number of first BL selection modules 115 is consistent with the total number of the first regions 111 and the fourth regions 141 and the number of second BL selection modules 125 is consistent with the total number of the second regions 121 and the third regions 131, in actual applications, a plurality of first regions 111 and a plurality of fourth regions 141 may share one of the first BL selection modules 115, and a plurality of second regions 121 and a plurality of third regions 131 may share one of the second BL selection modules 125.

In conclusion, by arranging two sense amplifiers 103 corresponding to adjacent BLs 102 on two sides of the memory section 101, it is beneficial to increase the spacing between the sense amplifiers 103 corresponding to the adjacent BLs 102 and avoid mutual interference between the sense amplifiers 103 corresponding to the adjacent BLs 102 due to a too small spacing, thereby improving the accuracy of data amplification. Moreover, different ECC modules are employed to perform ECC on two adjacent sense amplifiers 103 located on a same side of the memory section 101, which helps to reduce the number of memory cells that need to be checked and corrected by a single ECC module, thereby helping to reduce the complexity of the first ECC module 114 and the second ECC module 124 to reduce the layout area of a single ECC module in the memory and reduce the time taken for a single ECC module to check and correct data stored in the memory cells when a plurality of adjacent memory cells make an error at the same time, thus helping to ensure that the ECC capabilities of the first ECC module 114 and the second ECC module 124 can meet the requirements of the memory while ensuring lower preparation cost of the memory.

According to some embodiments of the present disclosure, another aspect of the embodiments of the present disclosure further provides a memory system, including the memory described above. In this way, it is beneficial to reduce the preparation cost of the memory in the memory device and enhance the ECC capabilities of the first ECC module 114 and the second ECC module 124 in the memory, thereby reducing the preparation cost of the memory device, and enhancing the overall ECC capability of the memory device.

In some embodiments, the memory device may be a double data rate (DDR) memory, such as a DDR4 memory, a DDR5 memory, a DDR6 memory, a LPDDR4 memory, a LPDDR5 memory, or a LPDDR6 memory.

Those skilled in the art can understand that the above implementations are specific embodiments for implementing the present disclosure. In practical applications, various changes may be made to the above embodiments in terms of form and details without departing from the spirit and scope of the embodiments of the present disclosure. Any person skilled in the art may make changes and modifications to the embodiments without departing from the spirit and scope of the present disclosure. Therefore, the protection scope of the present disclosure should be subject to the scope defined by the claims.

INDUSTRIAL APPLICABILITY

In the memory and the memory system thereof provided in the embodiments of the present disclosure, some of the BLs in the memory, some of the word lines in the memory section, and transistor structures constitute a single memory cell. The sense amplifiers are in one-to-one correspondence with different BLs corresponding to a same word line. By arranging two of the sense amplifiers corresponding to adjacent two of the BLs on two sides of the memory section, it is beneficial to increase the spacing between the sense amplifiers corresponding to the adjacent BLs and avoid mutual interference between the sense amplifiers corresponding to the adjacent BLs due to a too small spacing, thereby improving the accuracy of data amplification.

Moreover, in the memory and the memory system thereof provided in the embodiments of the present disclosure, the first ECC module and the second ECC module are independently arranged in the memory. One of two adjacent sense amplifiers located on a same side of the memory section is electrically connected to the first ECC module, and the other one of the two adjacent sense amplifiers located on the same side of the memory section is electrically connected to the second ECC module. That is, different ECC modules are employed to perform ECC on two adjacent sense amplifiers located on a same side of the memory section, such that different ECC modules are employed to perform ECC on the memory cells corresponding to the two sense amplifiers.

In addition, for the ECC circuit, the more bits of errors to be checked and corrected, the higher the complexity of the ECC circuit, and the higher the preparation cost of the ECC circuit. In the memory and the memory system thereof provided in the embodiments of the present disclosure, two ECC modules having lower complexity, namely the first ECC module and the second ECC module, are provided in the memory to respectively perform ECC on the adjacent sense amplifiers, thereby ensuring that the ECC capabilities of the first ECC module and the second ECC module can meet the requirements of the memory while ensuring lower preparation cost of the memory.

The invention claimed is:

1. A memory, comprising:
   memory sections and a plurality of bit lines (BLs) corresponding to a same memory section;
   sense amplifiers, electrically connected to the plurality of BLs in one-to-one correspondence, wherein two of the sense amplifiers corresponding to adjacent two of the BLs are located on two sides of the memory section; and
   a first error checking and correction (ECC) module and a second ECC module, wherein one of two adjacent sense amplifiers located on a same side of the memory section is electrically connected to the first ECC module, and the other one of the two adjacent sense amplifiers located on the same side of the memory section is electrically connected to the second ECC module;
   wherein the memory section has a first side and a second side opposite to each other, a region in which the sense amplifiers being in the first side are located comprises a first region and a second region, and a region in which the sense amplifiers being in the second side are located comprises a third region and a fourth region, wherein the first region directly faces the third region, and the second region directly faces the fourth region; and the memory further comprises: a first BL selection module and a second BL selection module, wherein the BLs corresponding to the sense amplifiers in the first region and the fourth region are controlled to be turned on by the first BL selection module, the BLs corresponding to the sense amplifiers in the second region and the third region are controlled to be turned on by the second BL selection module, and one of the first BL selection module and the second BL selection module is enabled.

2. The memory according to claim 1, wherein the sense amplifiers electrically connected to the BLs are located in extension directions of the BLs.

3. The memory according to claim 1, wherein the first region is adjacent to the second region, the third region is adjacent to the fourth region, the BLs electrically connected to the sense amplifiers in the second region are second BLs, the BLs electrically connected to the sense amplifiers in the third region are third BLs, one of the second BLs is adjacent to one of the third BLs, one of the second BL and the third BL adjacent to each other is connected to the first ECC module, and the other one of the second BL and the third BL adjacent to each other is connected to the second ECC module.

4. The memory according to claim 1, wherein the first region is adjacent to the second region, the third region is adjacent to the fourth region, the BLs electrically connected to the sense amplifiers in the first region are first BLs, the BLs electrically connected to the sense amplifiers in the fourth region are fourth BLs, one of the first BLs is adjacent to one of the fourth BLs, one of the first BL and the fourth BL adjacent to each other is connected to the first ECC module, and the other one of the first BL and the fourth BL adjacent to each other is connected to the second ECC module.

5. The memory according to claim 1, wherein along an extension direction of the memory section, a plurality of the first regions and a plurality of the second regions are alternately arranged, and a plurality of the third regions and a plurality of the fourth regions are alternately arranged.

6. The memory according to claim 1, wherein there are M sense amplifiers in the first region and the third region, and there are N sense amplifiers in the second region and the fourth region, wherein M is a positive integer greater than or equal to 2, and N is a positive integer greater than or equal to 2.

7. The memory according to claim 6, wherein M is equal to N.

8. The memory according to claim 1, wherein a plurality of the memory sections are arranged at intervals along extension directions of the BLs, wherein a first spacer region, a second spacer region and a third spacer region are sequentially arranged between adjacent four memory sections, the first spacer region and the third spacer region comprise the first region and the second region, and the second spacer region comprises the third region and the fourth region.

9. The memory according to claim 1, wherein in the sense amplifiers located on a same side of the memory section, the BLs corresponding to the sense amplifiers electrically connected to the first ECC module are first reference BLs, and the BLs corresponding to the sense amplifiers electrically connected to the second ECC module are second reference BLs, there are at least three BLs between adjacent first reference BLs, and there are at least three BLs between adjacent second reference BLs.

* * * * *